(12) United States Patent
Acee et al.

(10) Patent No.: US 11,279,477 B2
(45) Date of Patent: Mar. 22, 2022

(54) ROTATING ELECTRIC DISTRIBUTED ANTI-TORQUE FIN

(71) Applicant: Bell Textron Inc., Fort Worth, TX (US)

(72) Inventors: Aaron Alexander Acee, Flower Mound, TX (US); Andrew Paul Haldeman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 274 days.

(21) Appl. No.: 16/358,268

(22) Filed: Mar. 19, 2019

(65) Prior Publication Data
US 2020/0298970 A1 Sep. 24, 2020

(51) Int. Cl.
*B64C 27/82* (2006.01)
*B64C 27/06* (2006.01)
*B64C 27/52* (2006.01)

(52) U.S. Cl.
CPC .............. *B64C 27/82* (2013.01); *B64C 27/06* (2013.01); *B64C 27/52* (2013.01); *B64C 2027/8209* (2013.01); *B64C 2027/8227* (2013.01); *B64C 2027/8254* (2013.01); *B64C 2027/8272* (2013.01)

(58) Field of Classification Search
CPC ............ B64C 27/82; B64C 2027/8209; B64C 2027/827; B64C 2027/8254; B64C 2027/8227
See application file for complete search history.

(56) References Cited

U.S. PATENT DOCUMENTS

| | | | | |
|---|---|---|---|---|
| 2,378,617 A | * | 6/1945 | Burke | B64C 27/82 416/121 |
| 2,491,549 A | * | 12/1949 | Brewster | B64C 27/82 416/121 |
| 8,763,949 B2 | * | 7/2014 | Thomassey | B64C 27/82 244/17.13 |
| 9,194,285 B2 | | 11/2015 | Botti et al. | |
| 9,365,289 B2 | * | 6/2016 | Prud'Homme-Lacroix | B64C 27/56 |
| 10,112,697 B2 | | 10/2018 | Waltner | |
| 10,167,078 B2 | | 1/2019 | Waltner | |
| 2012/0012693 A1 | * | 1/2012 | Thomassey | B64C 27/82 244/17.21 |
| 2017/0225778 A1 | * | 8/2017 | Waltner | B64C 5/10 |
| 2017/0349273 A1 | * | 12/2017 | Parsons | B64C 27/82 |
| 2017/0349274 A1 | | 12/2017 | Fenny et al. | |
| 2017/0349276 A1 | | 12/2017 | Fenny | |
| 2018/0044010 A1 | * | 2/2018 | Groninga | F04D 25/166 |
| 2018/0346135 A1 | * | 12/2018 | Haldeman | B64C 27/06 |

* cited by examiner

*Primary Examiner* — Richard R. Green
*Assistant Examiner* — Arfan Y. Sinaki
(74) *Attorney, Agent, or Firm* — Shackelford, Bowen, McKinley & Norton, LLP

(57) ABSTRACT

An exemplary anti-torque system for a helicopter includes two or more electric fans rotatably mounted on a tail boom, the two or more electric fans rotatable about a longitudinal axis of the tail boom.

20 Claims, 3 Drawing Sheets

ROTATING ELECTRIC DISTRIBUTED ANTI-TORQUE FIN

BACKGROUND

This section provides background information to facilitate a better understanding of the various aspects of the disclosure. It should be understood that the statements in this section of this document are to be read in this light, and not as admissions of prior art.

Without limiting the scope of this disclosure, the background is described in connection with anti-torque systems. Anti-torque tail rotors are typically oriented such that the thrust vector is parallel with the ground in order to solely provide a restoring moment to the main rotor's torque. Some aircraft provide a permanent cant angle to the anti-torque thrust vector to aid in the aircraft's lift.

SUMMARY

An exemplary anti-torque system for a helicopter includes two or more electric fans rotatably mounted on a tail boom, the two or more electric fans rotatable about a longitudinal axis of the tail boom.

An exemplary method of operating a helicopter includes flying the helicopter, producing a thrust vector from an electric anti-torque fan, directing the thrust vector in a horizontal direction, and rotating the thrust vector from a horizontal direction to a non-horizontal direction.

Another exemplary method includes flying a helicopter having a main rotor and an electric distributed anti-torque system arranged in a fin and extending from a tail boom, the electric distributed anti-torque system having two or more electric fans, producing a thrust vector electric distributed anti-torque system, orienting the fin in a vertical position and directing the thrust vector in a horizontal direction, and rotating the fin to a non-vertical position and directing the thrust vector to produce lift.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
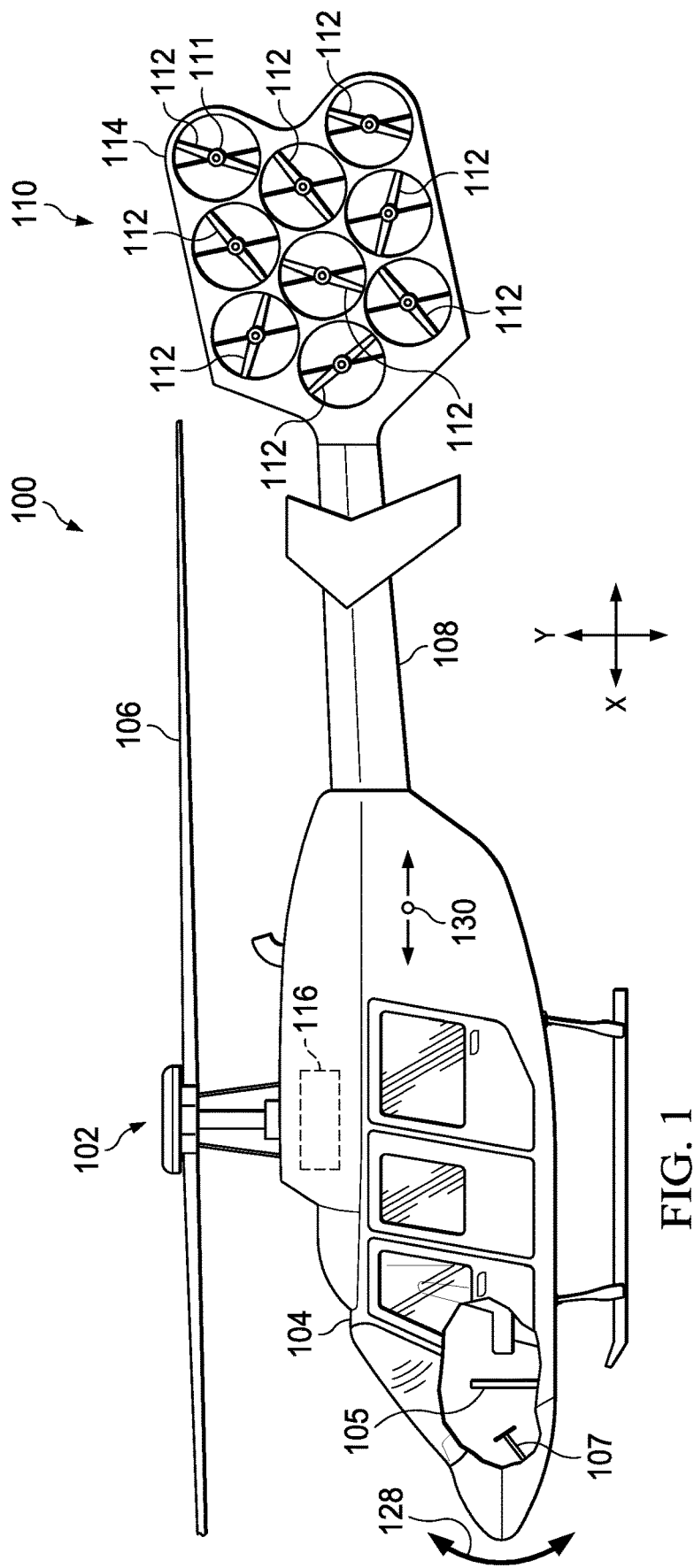
FIG. 1 illustrates an exemplary aircraft with an exemplary rotating electric distributed anti-torque system providing variable cant angles according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 illustrates an exemplary rotary aircraft 100, shown as a helicopter, having a rotating electric distributed propulsion system 110 with a plurality of fixed pitch rotors 112, i.e., fans, each directly driven by an electric motor 111. Fixed pitch rotors 112 are arranged in a plane to create a common thrust vector. In this example, electric distributed propulsion system 110 is implemented as an electric distributed anti-torque (EDAT) system 110, and includes nine fixed pitch rotors 112. EDAT system 110 may have two or more fixed pitch rotors 112. The two or more fixed pitch rotors 112 are supported by a structure 114, referred to herein as a fin. EDAT fin 114 can rotate around the longitudinal axis "X" of tail boom 108 between a position parallel with the vertical plane "Y" and non-vertical cant angles. Non-limiting examples of electric distributed anti-torque systems are disclosed in U.S. Publication 2017/0349276, the teachings of which are fully incorporated herein. Utilizing an electric distributed anti-torque system eliminates the traditional mechanically driven anti-torque fan, i.e. an anti-torque fan connected by a drive shaft to an engine or motor located in the fuselage.

Helicopter 100 includes a rotary system 102 carried by a fuselage 104. Rotor blades 106 connected to rotary system 102 provide flight for helicopter 100. Rotor blades 106 and EDAT system 110 may be controlled by multiple controllers within the fuselage 104. For example, during flight, a pilot can manipulate cyclic control 105 for changing a pitch angle of rotor blades 106 and/or manipulate pedals 107 to provide vertical, horizontal and yaw flight control. Helicopter 100 may include a controller 116, e.g., flight computer, connected to one or more of the pilot controls and the rotor systems. The flight computer can control various operations of the engine driving the main rotor, the electric fixed pitch rotors 112, and the cyclic and collective operations in accordance with pilot input commands and flight conditions.

Figure 2:
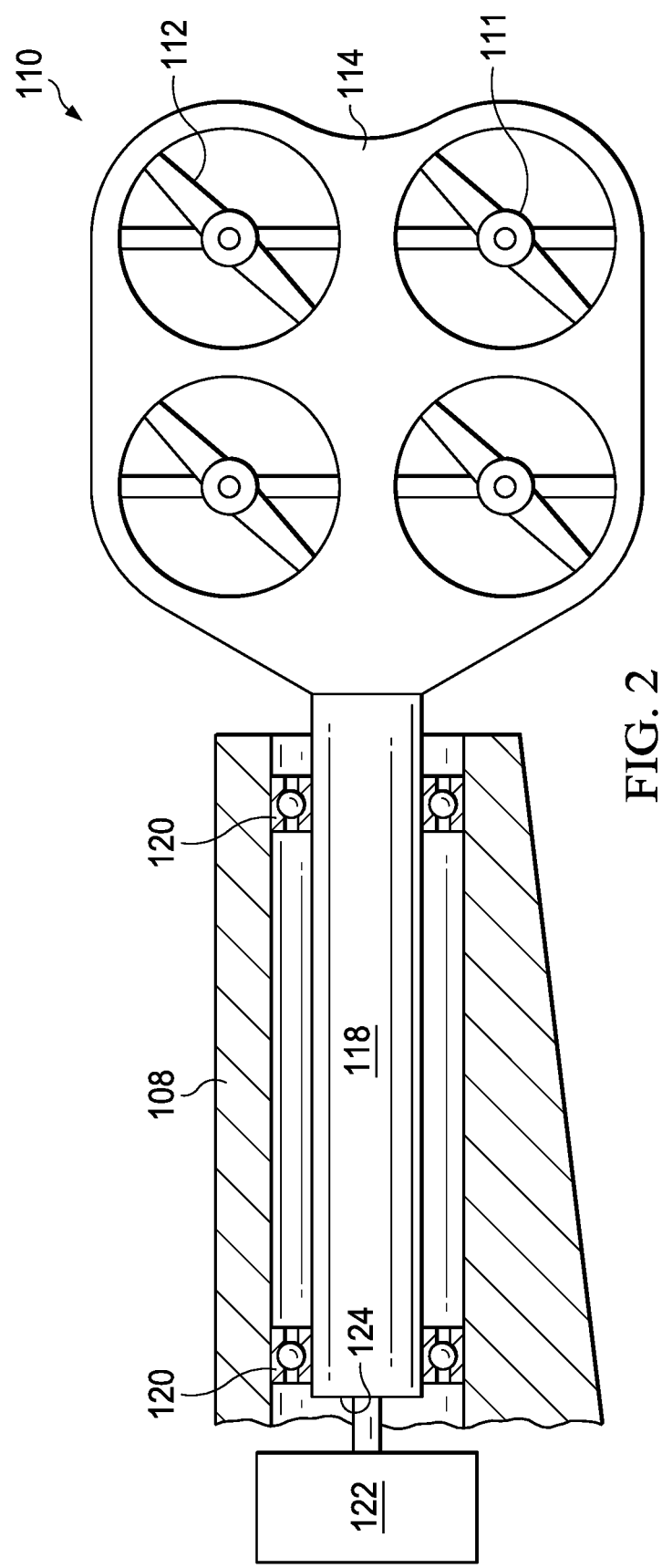
FIG. 2 illustrates an exemplary rotating electric distributed anti-torque system according to one or more aspects of the disclosure.
Figure 3:
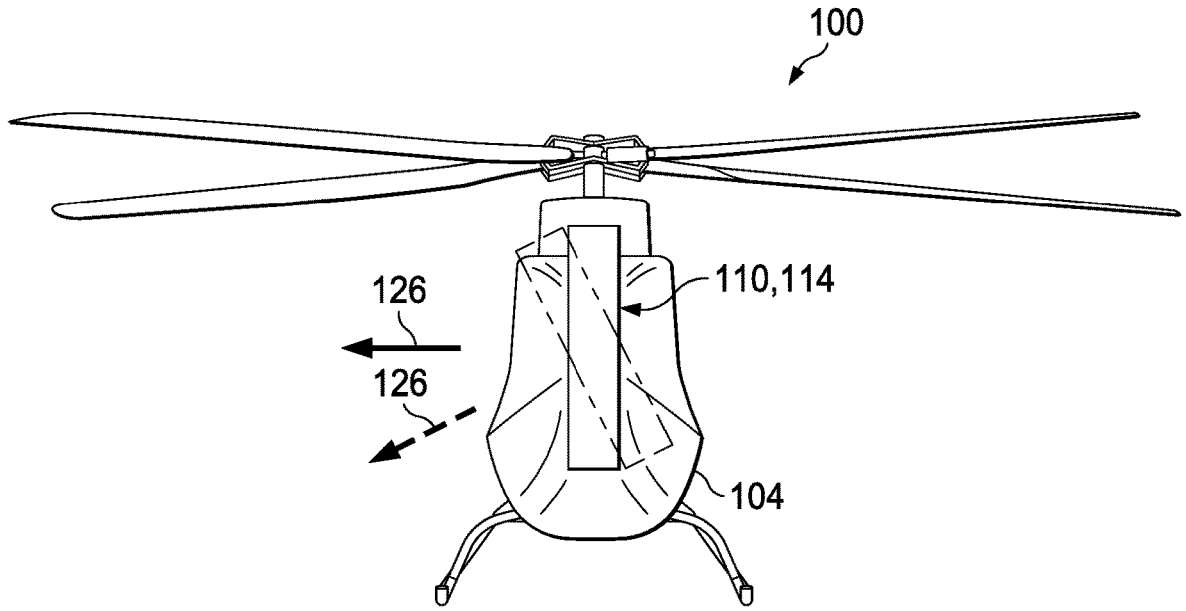
FIG. 3 is an aft view illustrating an exemplary electric distributed anti-torque fin at variable cant angles according to one or more aspects of the disclosure.

With reference to FIGS. 1-3, helicopter 100 has a tail boom 108, which rotatably supports EDAT system 110 in fin 114 at the aft end. Helicopter anti-torque systems are typically oriented such that the thrust vector 126 is parallel with the ground in order to solely provide a restoring moment to the main rotor's torque. Some aircraft provide a permanent cant angle to the anti-torque thrust vector such that a portion of the anti-torque system can aid in the aircraft's lift. The cant angle is beneficial in a flight condition that does not require maximum anti-torque because there is some margin for the canted anti-torque system to provide the lifting force;

however, in a flight condition where maximum anti-torque thrust is needed, such as a 35-knot sideward flight, the cant angle is inefficient and requires that the anti-torque system be larger than if it were not canted.

EDAT system 110 is rotatable allowing the cant angle to be varied. An exemplary embodiment of an EDAT fin 114 is illustrated in FIG. 2. EDAT fin 114 includes an elongated shaft 118 that is disposed inside of tail boom 108 and extends along the longitudinal axis of tail boom 108. Shaft 118 is rotatably supported in tail boom 108 by bearings 120. A motor 122 is connected to a forward end 124 of shaft 118 and is operable to rotate EDAT fin 114. Motor 122 may be for example an electric or hydraulic motor. Motor 122 is connected to EDAT fin 114 so that it cannot be back-driven by the thrust or aerodynamic moment generated by EDAT fin 114. Motor 122 may be controlled through an automatic switch or manually controlled by the pilot depending on when more or less cant is desired.

FIG. 3 illustrates an aft view of an exemplary rotary aircraft 100 implementing an EDAT system 110 in a rotating EDAT fin 114. EDAT system 110 can be operated to produce a thrust 126 shown by the arrows. EDAT fin 114 is shown in the vertical position, 0 degree cant angle, by solid lines and at a non-vertical cant angle by dashed lines. In accordance to an embodiment, EDAT fin 114 can be rotated during flight between 0 degrees, parallel to vertical, and 90 degrees, i.e. horizontal. In one embodiment, EDAT fin 114 can be rotated during flight between 0 degrees, parallel to vertical, and about 20 degrees relative to vertical. In some embodiments, rotation of EDAT fin 114 may be limited during flight to an arc, for example, from vertical to about 45 degrees to vertical. In an embodiment, rotation of EDAT fin 114 may be limited during flight to an arc, for example, from vertical to about 20 degrees to vertical. In an embodiment, FIG. 3 illustrates EDAT fin 114 with solid lines positioned at a cant angle of 0 degrees and with dashed lines positioned at a cant angle of about 15 degrees.

Variable cant angles can be provided during flight because EDAT system 110 is electrically powered (electric fans) and it does not require a rigid mechanic drive to supply power from the fuselage. The variable cant angle can provide a direct anti-torque thrust 126 when maximum anti-torque thrust is needed as well as provide a lifting force when maximum anti-torque thrust is not needed. Maximum anti-torque thrust 126 is provided when EDAT fin 114 is oriented in the vertical position shown by the solid lines. A thrust 126 providing a lifting force and an anti-torque force can be provided when the EDAT fin 114 is canted as shown by the dashed lines. With reference to FIG. 1, a pilot may manually control the cant angle to control the pitch attitude 128. The pitch attitude 128 may be changed for example due to a change in the aircraft's center of gravity 130 and/or to reduce drag on the aircraft.

Figure 4:
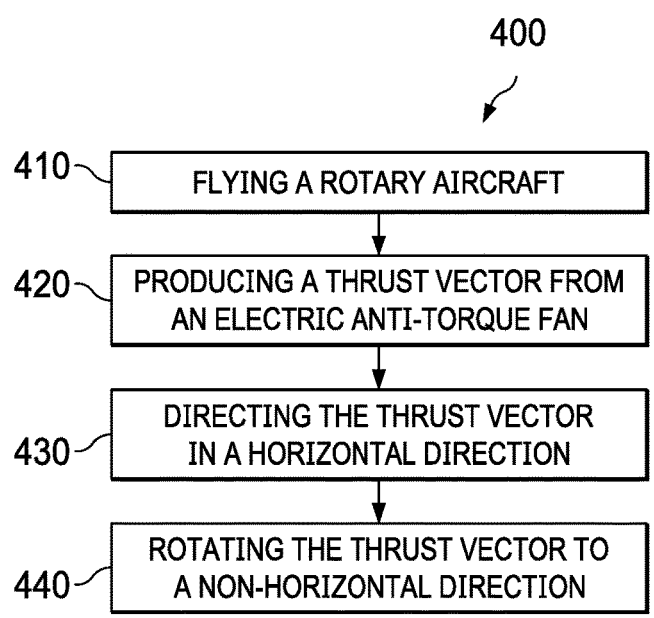
FIG. 4 illustrates an exemplary method of operating a helicopter.

FIG. 4 illustrates an exemplary method 400 of operating a helicopter 100 with reference to FIGS. 1-3. At block 410, helicopter 100 is flown by operating main rotor 106. At block 420, a thrust vector 126 is produced from one or more the electric fans 112. At block 430, thrust vector 126 is directed in a horizontal direction with EDAT system 110 oriented in a vertical position. At block 440, thrust vector 126 is rotated during flight from the horizontal direction to a non-horizontal direction by rotating EDAT system 110 to a non-vertical position. Thrust vector 126 may be rotated to the non-horizontal direction to provide lift for example to change the pitch attitude 128 of helicopter 100.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of operating a helicopter, the method comprising:
    flying the helicopter comprising a main rotor and an electric distributed anti-torque (EDAT) system comprising two or more electric fans arranged in a fin and a same plane to create a common thrust vector, a shaft disposed inside of a tail boom and extending along a longitudinal axis of the tail boom, the fin rotationally fixed to an aft end of the shaft to rotate in unison with the shaft and a motor connected to a forward end of the shaft opposite from the fin;

producing a thrust vector from the electric distributed anti-torque system;

orienting the fin in a vertical position and directing the thrust vector in a horizontal direction, whereby the orienting comprises rotating the shaft and the fin in unison; and rotating the shaft and the fin in unison thereby moving the fin from the vertical position to a non-vertical position and directing the thrust vector to produce lift.

2. The method of claim 1, changing a pitch attitude of the helicopter in response to rotating the fin to the non-vertical position.

3. The method of claim 1, wherein the non-vertical position is between 0-degrees and about 20-degrees to vertical.

4. The method of claim 1, wherein at least one electric fan of the two or more electric fans is radially offset from the longitudinal axis.

5. The method of claim 1, wherein the non-vertical position is substantially horizontal.

6. The method of claim 1, wherein the non-vertical position is between 0-degrees and about 45-degrees to vertical.

7. The method of claim 1, wherein the motor is a hydraulic motor.

8. The method of claim 1, wherein the motor cannot be back-driven by the thrust or aerodynamic moment generated by the two or more electric fans.

9. The method of claim 8, wherein the non-vertical position is substantially horizontal.

10. The method of claim 8, wherein the non-vertical position is between 0-degrees and about 45-degrees to vertical.

11. A helicopter anti-torque system, the system comprising:
a shaft disposed inside of a tail boom and extending along a longitudinal axis of the tail boom;
a fin rotationally fixed to an end of the shaft to rotate in unison with the shaft, the fin carrying two or more electric fans that are arranged in a same plane to create a common thrust vector; and
a motor connected to a forward end of the shaft opposite the fin, the motor operable to rotate the fin and the shaft in unison.

12. The system of claim 11, wherein the fin is rotatable between a vertical position and non-vertical positions.

13. The system of claim 11, wherein the fin is rotatable during flight in a range including a vertical position and a horizontal position.

14. The system of claim 11, wherein rotation of the fin during flight is limited to an arc from vertical to about 20 degrees to vertical.

15. The system of claim 11, wherein at least one electric fan of the two or more electric fans is radially offset from the longitudinal axis.

16. The system of claim 11, wherein the motor is a hydraulic motor.

17. The system of claim 11, wherein the motor cannot be back-driven by the thrust or aerodynamic moment generated by the two or more electric fans.

18. The system of claim 17, wherein the fin is rotatable during flight in a range including a vertical position and a horizontal position.

19. The system of claim 17, wherein rotation of the fin during flight is limited to an arc from vertical to about 45-degrees to vertical.

20. The system of claim 17, wherein the motor is a hydraulic motor.

* * * * *